United States Patent
Kim et al.

(10) Patent No.: US 10,349,300 B2
(45) Date of Patent: Jul. 9, 2019

(54) METHOD AND DEVICE FOR APPLYING LOAD-SPECIFIC OFFSET BY TERMINAL IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/562,263

(22) PCT Filed: Apr. 7, 2016

(86) PCT No.: PCT/KR2016/003641
§ 371 (c)(1),
(2) Date: Sep. 27, 2017

(87) PCT Pub. No.: WO2016/163769
PCT Pub. Date: Oct. 13, 2016

(65) Prior Publication Data
US 2018/0098237 A1    Apr. 5, 2018

Related U.S. Application Data

(60) Provisional application No. 62/146,215, filed on Apr. 10, 2015.

(51) Int. Cl.
*H04W 4/00* (2018.01)
*H04W 24/10* (2009.01)
(Continued)

(52) U.S. Cl.
CPC ......... *H04W 24/10* (2013.01); *H04L 43/0882* (2013.01); *H04L 43/16* (2013.01);
(Continued)

(58) Field of Classification Search
None
See application file for complete search history.

(56) References Cited

U.S. PATENT DOCUMENTS

2013/0242787 A1    9/2013  Sun et al.
2014/0029420 A1*   1/2014  Jeong .................. H04L 12/5692
                                                          370/229
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 27, 2015; http://www.3gpp.org/dynareport/36331.htm; See section 5.5.4.

*Primary Examiner* — Zewdu A Beyen
(74) *Attorney, Agent, or Firm* — Birch, Stewart, Kolasch & Birch, LLP

(57) ABSTRACT

Provided are a method for applying a load-specific offset by a terminal in a wireless communication system and a device supporting same. A terminal can receive BSS load information from a WLAN AP, calculate a load-specific offset on the basis of the BSS load information, and apply the load-specific offset to a measurement report-inducing event.

14 Claims, 17 Drawing Sheets

(51) Int. Cl.
    *H04W 24/08*     (2009.01)
    *H04W 36/00*     (2009.01)
    *H04W 36/30*     (2009.01)
    *H04L 12/26*     (2006.01)
    *H04W 28/02*     (2009.01)
    *H04W 4/06*     (2009.01)
    *H04W 84/04*     (2009.01)
    *H04W 48/20*     (2009.01)

(52) U.S. Cl.
    CPC ....... *H04W 24/08* (2013.01); *H04W 36/0088* (2013.01); *H04W 36/0094* (2013.01); *H04W 36/30* (2013.01); *H04L 43/06* (2013.01); *H04W 4/06* (2013.01); *H04W 28/02* (2013.01); *H04W 48/20* (2013.01); *H04W 84/045* (2013.01)

(56) References Cited

U.S. PATENT DOCUMENTS

| | | |
|---|---|---|
| 2014/0098734 A1 | 4/2014 | Kalhan et al. |
| 2014/0112310 A1 | 4/2014 | Teyeb et al. |
| 2015/0038141 A1 | 2/2015 | Cheng |
| 2015/0327131 A1* | 11/2015 | Teyeb ..................... H04W 8/24 370/331 |

\* cited by examiner (a)

(b)

METHOD AND DEVICE FOR APPLYING LOAD-SPECIFIC OFFSET BY TERMINAL IN WIRELESS COMMUNICATION SYSTEM

CROSS REFERENCE TO RELATED APPLICATIONS

This application is the National Phase of PCT International Application No. PCT/KR2016/003641, filed on Apr. 7, 2016, which claims priority under 35 U.S.C. 119(e) to U.S. Provisional Application No. 62/146,215, filed on Apr. 10, 2015, all of which are hereby expressly incorporated by reference into the present application.

BACKGROUND OF THE INVENTION

Field of the Invention

The present invention relates to a wireless communication system, and more particularly, to a method for applying, by a UE, a load-specific offset to a measurement report-triggering event in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Recently, with an increase in data traffic usage, methods have been required that sufficiently satisfy the demand on data use from customers without involving large-scale investment in facilities or a huge increase in communication fees. Accordingly, in order to cope with a data explosion, a large number of wireless service carriers adopt one solution of offloading wireless data traffic concentrating on 3G or LTE networks by utilizing a WLAN communication method available in an unlicensed band, such as the ISM bands.

An unlicensed band is characterized in that since wireless service carriers do not need to obtain the exclusive right to use frequencies in this band through an auction process or the like, an elaborately-designed WLAN is capable of handling significant levels of capacity at remarkably low costs in this band, as compared with a network established in a licensed band. However, since large numbers of communication equipment may be used in an unlicensed band without restriction under rules associated with a certain level of adjacent band protection and in-band interference, a communication service using the unlicensed band may not guarantee as high communication quality as a communication service through a licensed band within the exclusive right can provide. In addition, although standardization for interworking HSPA or LTE services as 3GPP technologies with Wi-Fi as an IEEE technology has been in progress since 2002, it is difficult to completely integrate two networks with different network structures and to provide a service in view of handover and guaranteed QoS.

In order to solve these problems, LTE technology in an unlicensed band (LTE on unlicensed spectrum (LTE-U) or U-LTE) has been actively discussed recently.

SUMMARY OF THE INVENTION

Many non-operator WLAN APs may be deployed in the coverage of an unlicensed LTE cell. A WLAN may report BSS load information via a beacon or probe response, and the load information may include the number of STAs, channel utilization rate, and available channel capacity of a BSS. However, considering the coverage of the WLAN APs, it may be impossible for the LTE cell to receive this load information. As a result, a UE may receive a great amount of interference from a hidden node on an unlicensed frequency. Thus, the present invention proposes a method in which a UE obtains BSS load information, calculates a load-specific offset based on the BSS load information, and applies the calculated load-specific offset to a conventional measurement report-triggering event.

According to one embodiment, there is provided a method for applying, by a UE, a load-specific offset in a wireless communication system. The method may include: receiving basic service set (BSS) load information from a WLAN AP; calculating a load-specific offset based on the BSS load information; and applying the load-specific offset to a measurement report-triggering event.

The BSS load information may include at least one of a number of STAs, channel utilization rate, and available channel capacity of a BSS.

The method may further include receiving, by the UE, a load mapping table comprising one or more offsets, wherein the load-specific offset may be an offset corresponding to the BSS load information among the one or more offsets. As the channel utilization rate is higher, the offset corresponding to the BSS load information may be smaller. As the available channel capacity is higher, the offset corresponding to the BSS load information may be larger.

When the channel utilization rate is higher than a predefined channel utilization rate threshold, the load-specific offset may have a negative value; and when the channel utilization rate is lower than the predefined channel utilization rate threshold, the load-specific offset may have a positive value.

When the available channel capacity is higher than a predefined available channel capacity threshold, the load-specific offset may have a positive value; and when the available channel capacity is lower than the predefined available channel capacity threshold, the load-specific offset may have a negative value.

A plurality of pieces of BSS load information may be received. The load-specific offset may be calculated based on BSS load information received from a WLAN AP providing a strongest signal. The load-specific offset may be calculated based on an average value of the plurality of pieces of BSS load information.

The load-specific offset may be applied to a measurement report-triggering event in an unlicensed frequency.

According to still another embodiment, there is provided a UE applying a load-specific offset in a wireless communication system. The UE may include: a memory; a transceiver; and a processor to connect the memory and the transceiver, wherein the processor may be configured to: control the transceiver to receive BSS load information from a WLAN AP; calculate a load-specific offset based on the BSS load information; and apply the load-specific offset to a measurement report-triggering event.

It is possible to minimize interference from a hidden node on an unlicensed frequency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
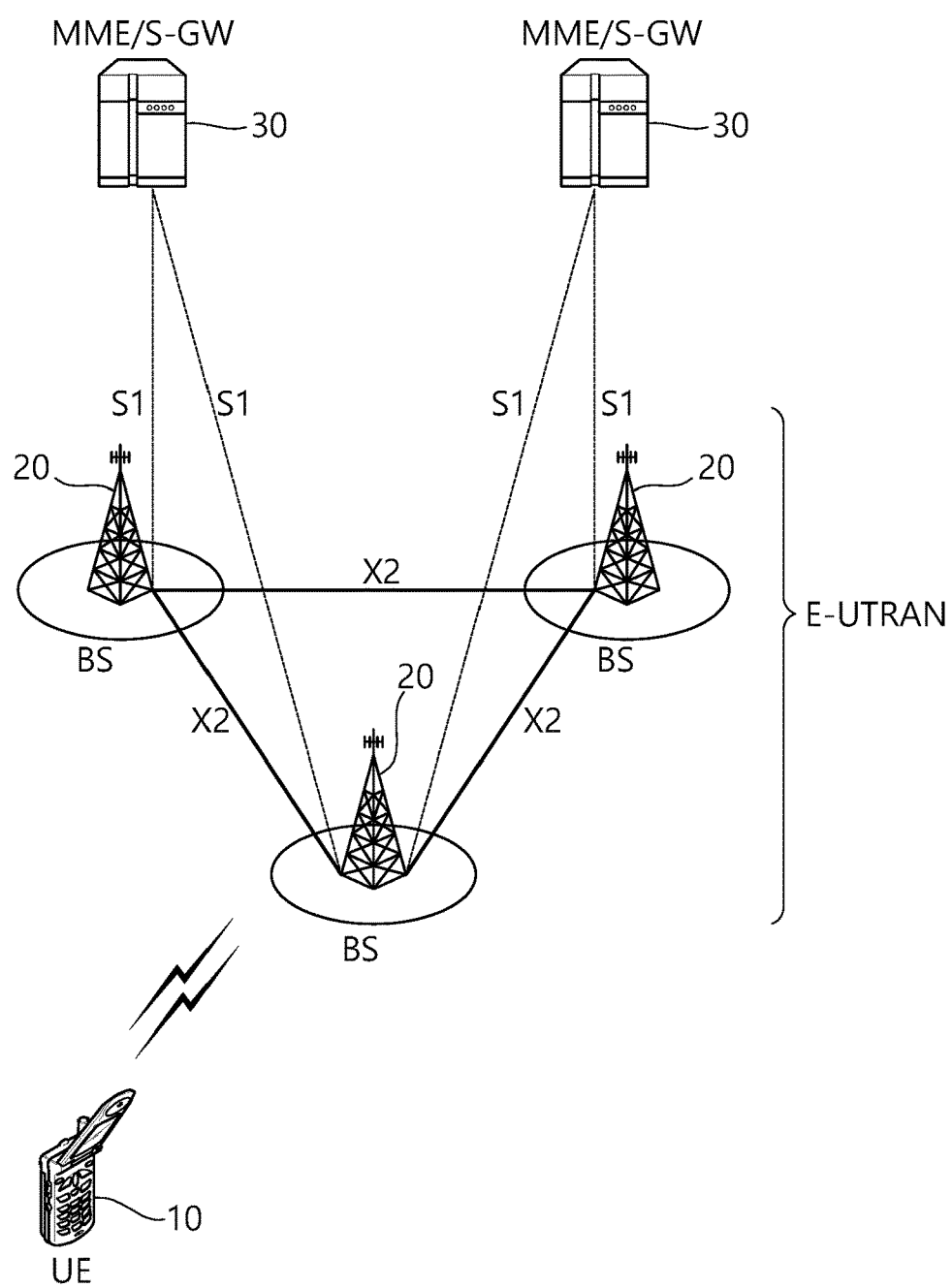
FIG. 1 shows LTE system architecture.

FIG. 1 shows LTE system architecture. The communication network is widely deployed to provide a variety of communication services such as voice over Internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
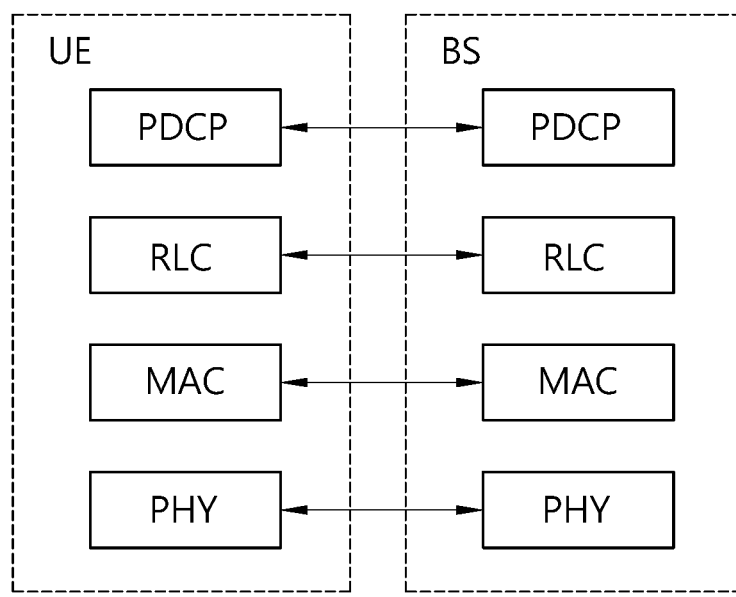
FIG. 2 shows a control plane of a radio interface protocol of an LTE system.
Figure 3:
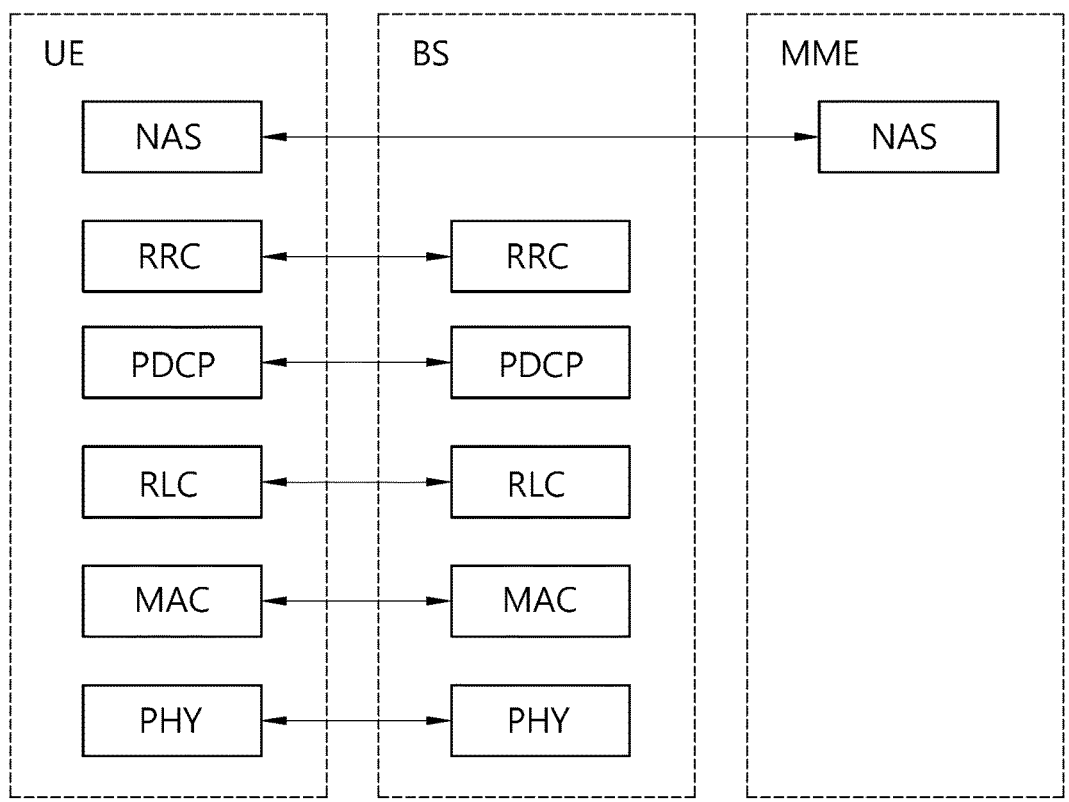
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
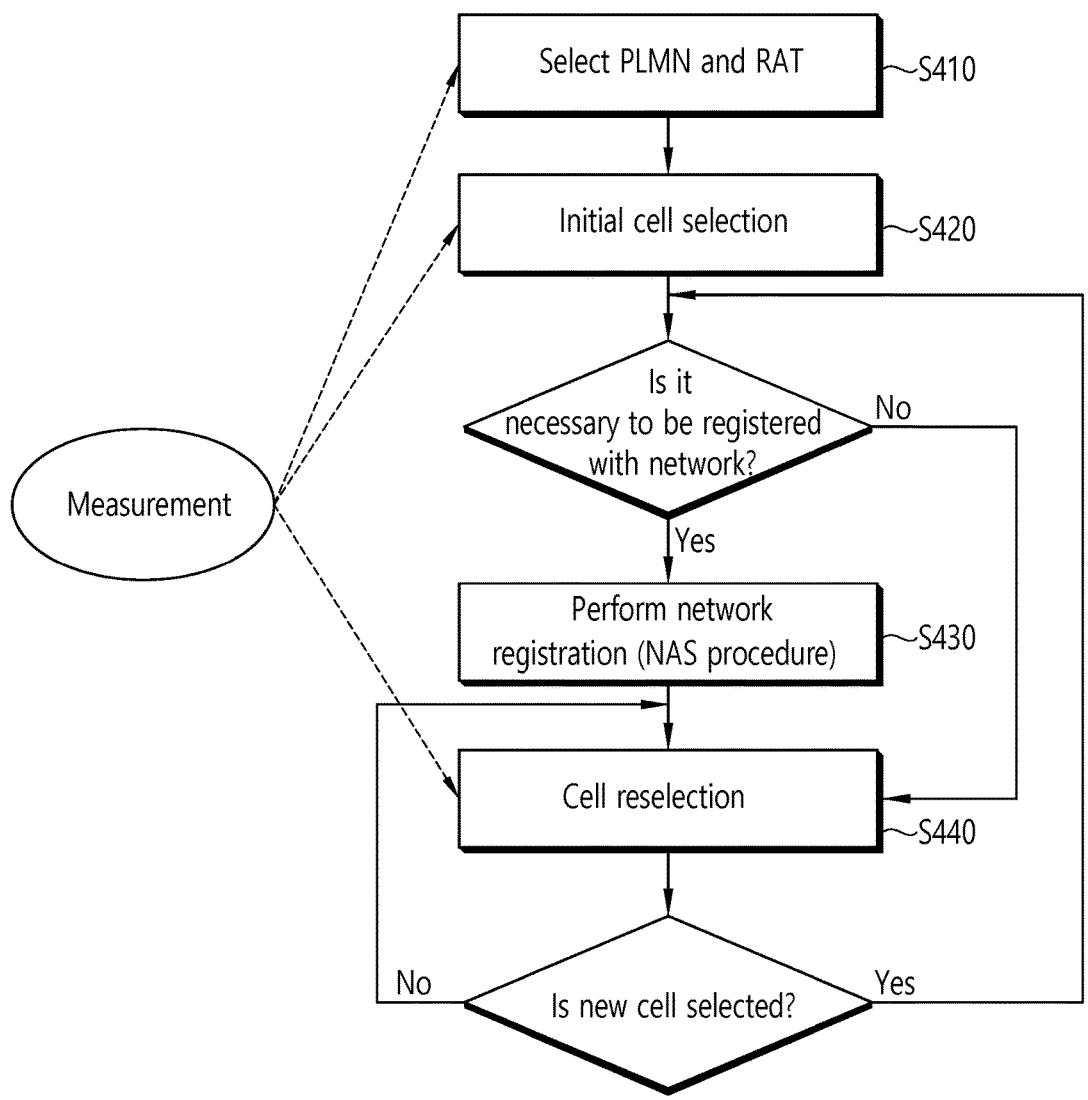
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
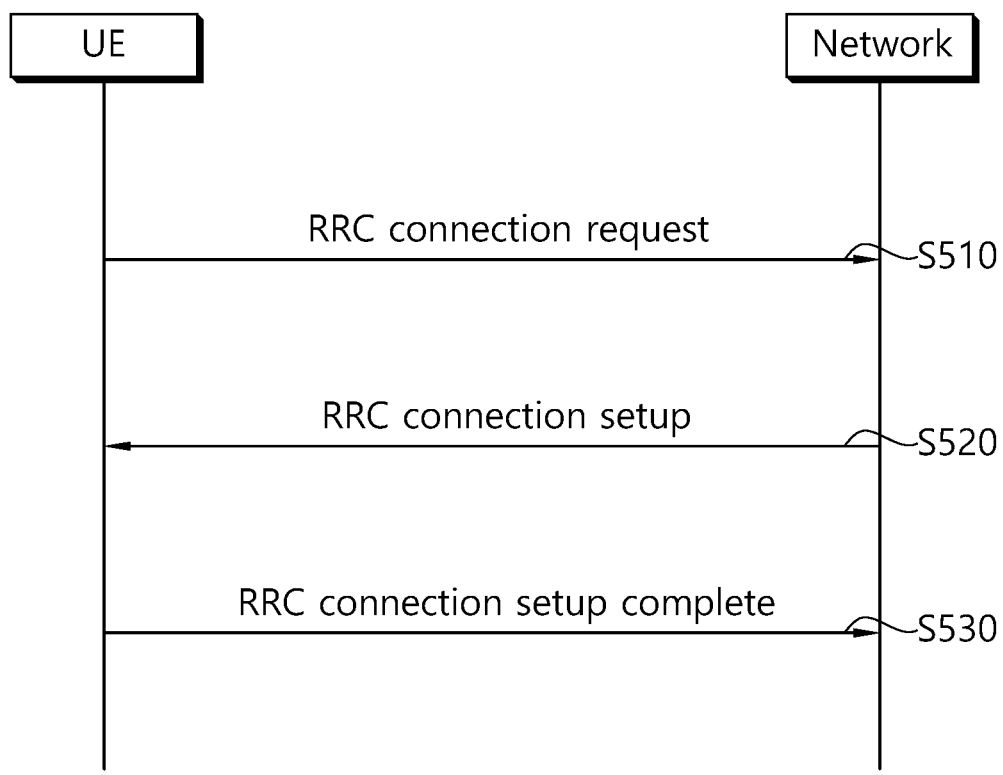
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
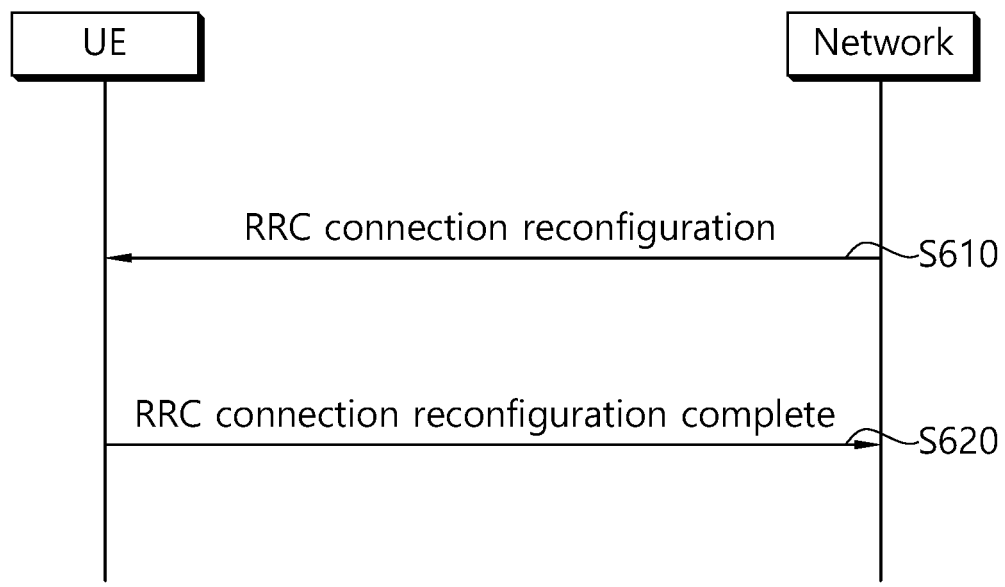
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

Hereinafter, a method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,n} - Q_{offset} \quad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
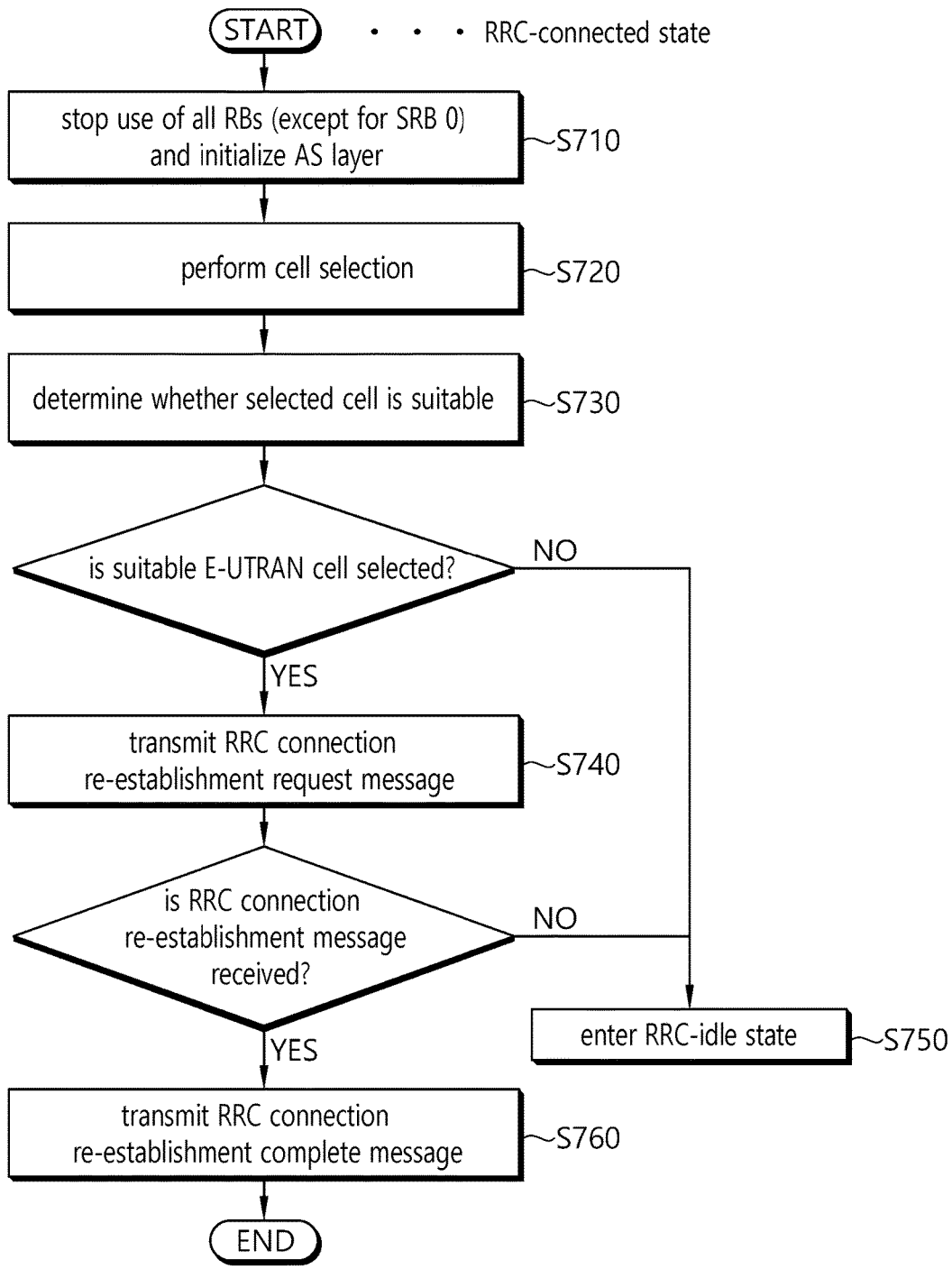
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
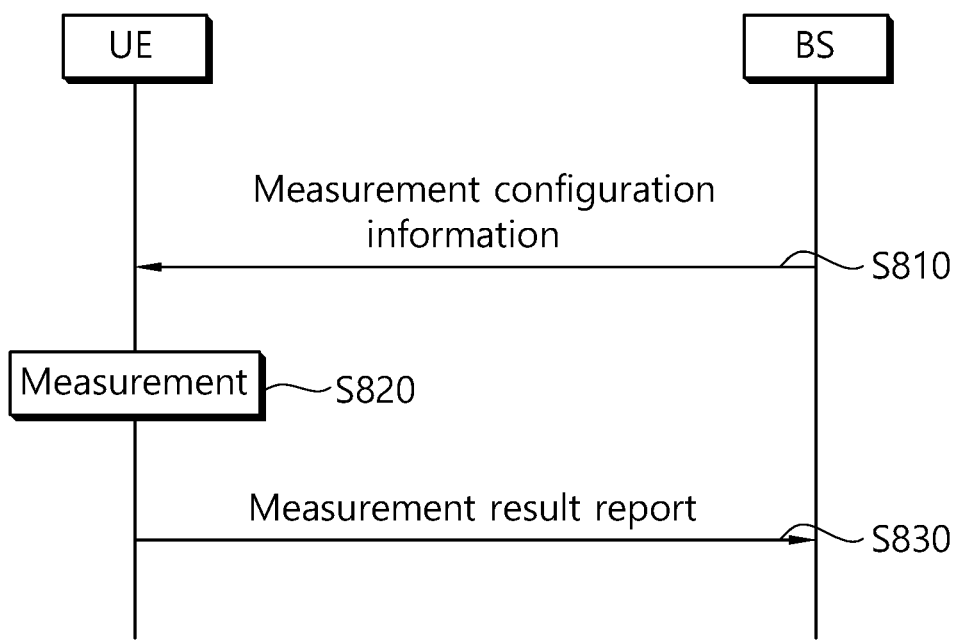
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement Object:

The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting Configuration:

This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement Identify:

Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity Configuration:

One quantity configuration is configured per RAT type. The quantity configuration defines the measurement quantities and associated filtering used for all event evaluation and related reporting of that measurement type. One filter can be configured per measurement quantity.

(5) Measurement Gaps:

Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
| --- | --- |
| Event A1 | Serving becomes better than threshold |
| Event A2 | Serving becomes worse than threshold |
| Event A3 | Neighbour becomes offset better than PCell/PSCell |
| Event A4 | Neighbour becomes better than threshold |
| Event A5 | PCell/PSCell becomes worse than threshold1 and neighbour becomes better than threshold2 |
| Event A6 | Neighbour becomes offset better than SCell |
| Event B1 | Inter RAT neighbour becomes better than threshold |
| Event B2 | PCell becomes worse than threshold1 and inter RAT neighbour becomes better than threshold2 |
| Event C1 | CSI-RS resource becomes better than threshold |
| Event C2 | CSI-RS resource becomes offset better than reference CSI-RS resource |

Figure 9:
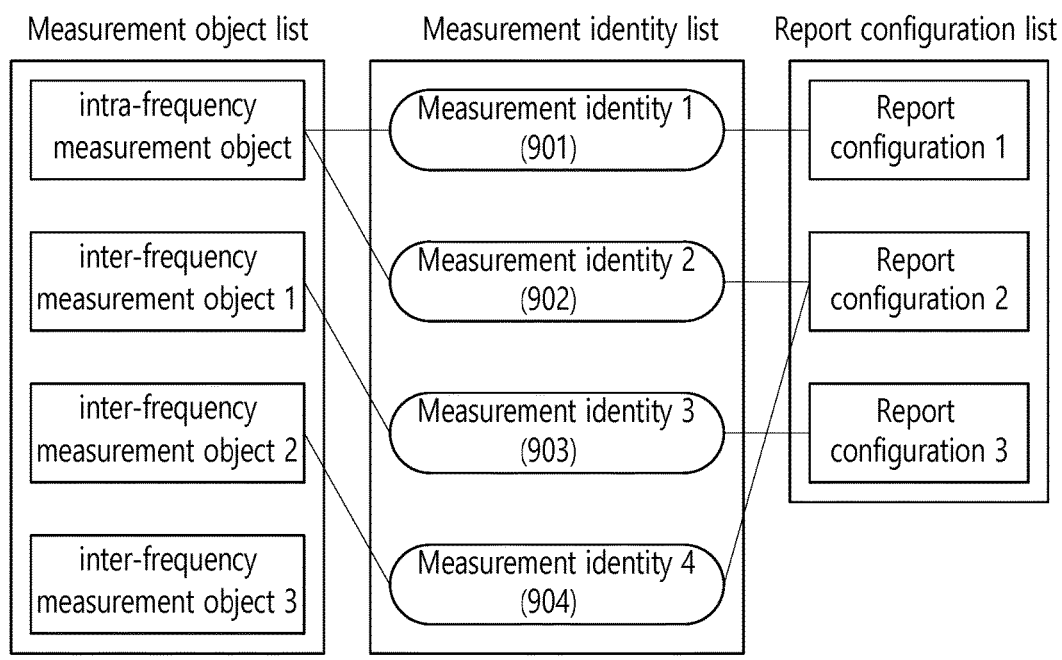
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier 1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
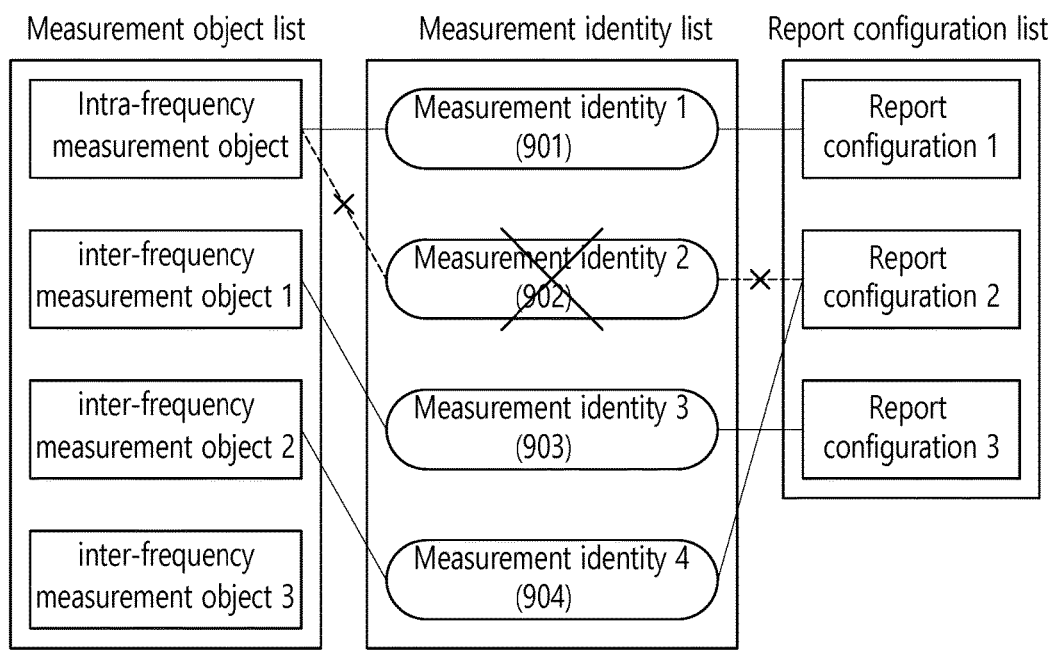
FIG. 10 shows an example of deleting a measurement identity.

FIG. 10 shows an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
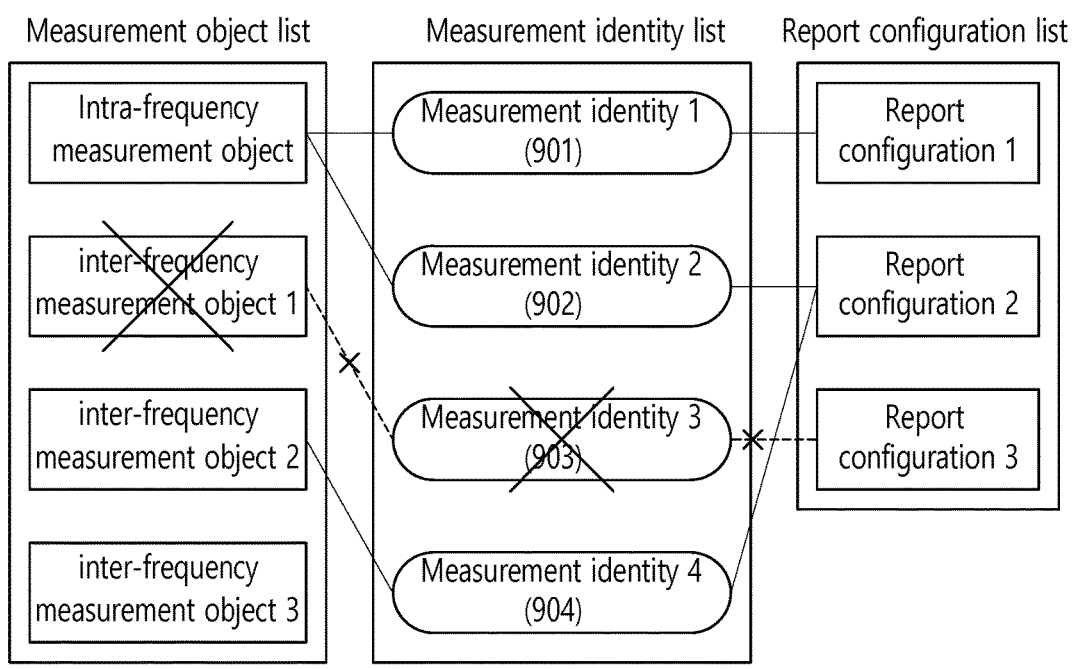
FIG. 11 shows an example of deleting the measurement object.

FIG. 11 shows an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

Figure 12:
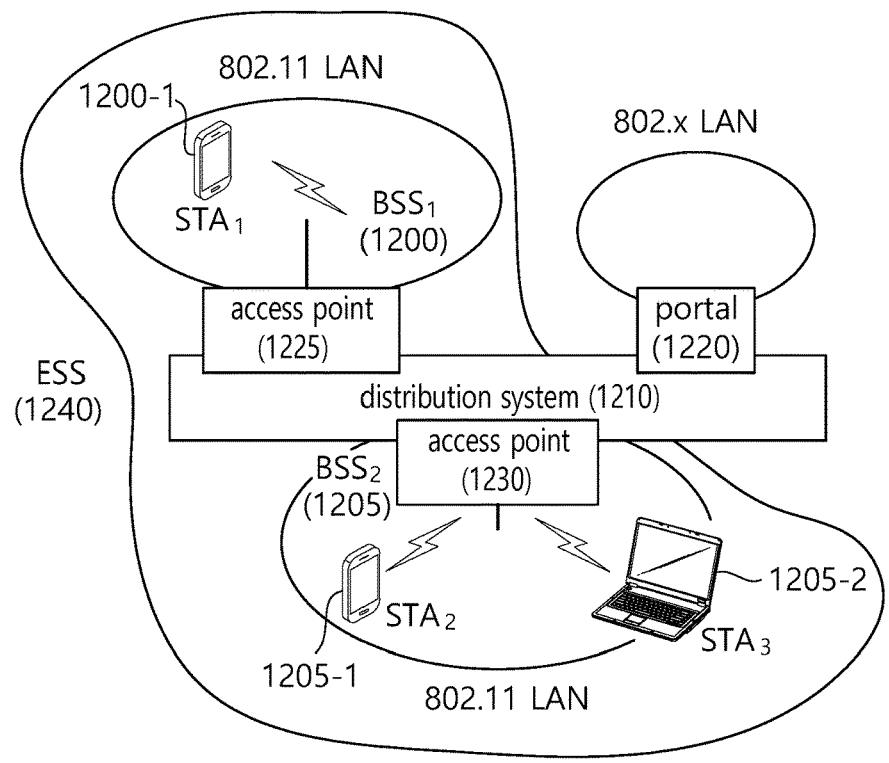
FIG. 12 illustrates the structure of a wireless local area network (WLAN)
Figure 12:
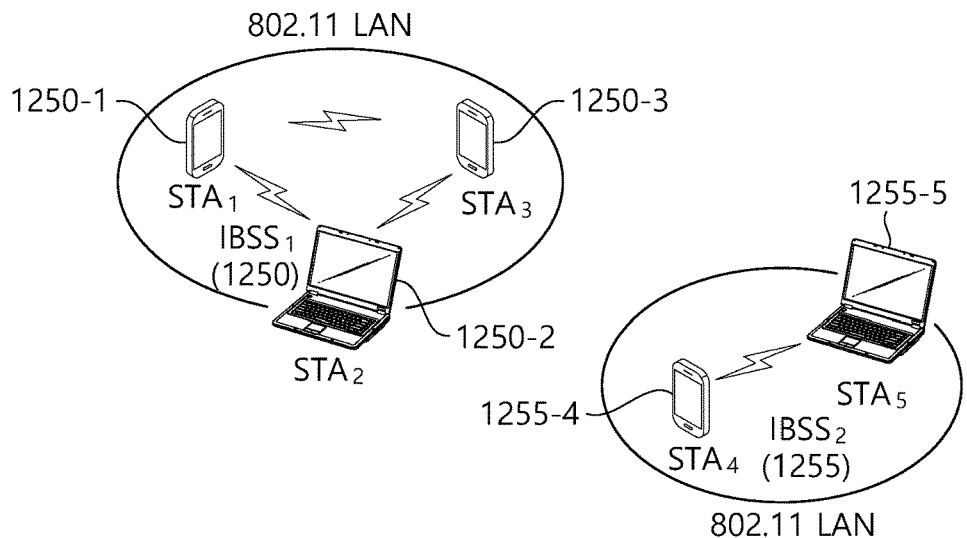

FIG. 12 illustrates the structure of a wireless local area network (WLAN). FIG. 12(a) illustrates the structure of an infrastructure network of Institute of Electrical and Electronics Engineers (IEEE) 802.11. FIG. 12(b) illustrates an independent BSS.

Referring the FIG. 12(a), a WLAN system may include one or more basic service sets (BSSs) 1200 and 1205. The BSSs 1200 and 1205 are a set of an access point (AP) and a station (STA), such as an AP 1225 and STA1 1200-1, which are successfully synchronized to communicate with each other, and are not a concept indicating a specific region. The BSS 1205 may include one AP 1230 and one or more STAs 1205-1 and 1205-2 that may be connected to the AP 1230.

An infrastructure BSS may include at least one STA, APs 1225 and 1230 providing a distribution service, and a distribution system (DS) 1210 connecting a plurality of APs.

The distribution system 1210 may configure an extended service set (ESS) 1240 by connecting a plurality of BSSs 1200 and 1205. The ESS 1240 may be used as a term indicating one network configured by connecting one or more APs 1225 or 1230 through the distribution system 1210. APs included in one ESS 1240 may have the same service set identification (SSID).

A portal 1220 may serve as a bridge that connects the WLAN (IEEE 802.11) and another network (for example, 802.X).

In the infrastructure network illustrated in the FIG. 12(a), a network between the APs 1225 and 1230 and a network between the APs 1225 and 1230 and the STAs 1200-1, 1205-1, and 1205-2 may be configured. However, it is possible to configure a network between STAs in the absence of the APs 1225 and 1230 to perform communication. A network configured between STAs in the absence of the APs 1225 and 1230 to perform communication is defined as an ad hoc network or independent basic service set (BSS).

Referring to FIG. 12(b), an independent BSS (IBSS) is a BSS that operates in an ad hoc mode. The IBSS includes no AP and thus has no centralized management entity that performs a management function at the center. That is, in the IBSS, STAs 1250-1, 1250-2, 1250-3, 1255-4, and 1255-5 are managed in a distributed manner. In the IBSS, all STAs 1250-1, 1250-2, 1250-3, 1255-4, and 1255-5 may be mobile STAs. Further, the STAs are not allowed to access the DS and thus establish a self-contained network.

An STA is a functional medium including medium access control (MAC) and a physical layer interface for a radio medium according to IEEE 802.11 specifications and may be used to broadly mean both an AP and a non-AP STA.

An STA may also be referred to as various names, such as a mobile terminal, a wireless device, a wireless transmit/receive unit (WTRU), user equipment (UE), a mobile station (MS), a mobile subscriber unit, or simply a user.

Hereinafter, a reference signal (RS) is described.

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal. When the transmitter transmits and receives data by using multiple antennas, it is preferable that a channel state between each transmitting antenna and each receiving antenna should be detected, whereby the receiver may receive the data exactly. At this time, it is preferable that each transmitting antenna of the transmitter has its individual reference signal to detect the channel state.

Downlink reference signals include a common reference signal (CRS) shared by all UEs in one cell, a UE-specific reference signal (UE-specific RS) only for a specific UE, a multimedia broadcast and multicast single frequency network (MBSFN) reference signal, a positioning reference signal (PRS), and a channel state information reference signal (CSI RS).

A transmitter may provide information for demodulation and channel measurement to a receiver using reference signals. The receiver (for example, a UE) may measure a channel state using a CRS and may feed an indicator relating to channel quality, such as a channel quality indicator (CQI), a precoding matrix index (PMI) and/or a rank indicator (RI), back to the transmitter (for example, a BS) according to the measured channel state. In the present specification, a CRS may be a cell-specific reference signal (cell-specific RS). The CRS is transmitted via all downlink subframes within a cell supporting PDSCH transmission. The CRS may be transmitted through antenna ports 0 to 3 and may be defined only for $\Delta f=15$ kHz. The CRS is disclosed in Section 6.10.1 of 3GPP TS 36.211 V10.1.0 (2011-03).

Meanwhile, a reference signal relating to the feedback of channel state information (CSI) may be defined as a CSI-RS. The CSI-RS may be relatively sparsely deployed in a frequency domain or time domain, and may be punctured in a data region of a normal subframe or an MBSFN subframe. If necessary, a CQI, a PMI, and an RI may be reported from a UE through CSI estimation.

A UE-specific RS may be transmitted to UEs through resource elements when the demodulation of data on a PDSCH is needed. A UE may receive the presence of a UE-specific RS through upper-layer signaling. The UE-specific RS is valid only when mapped to a corresponding PDSCH signal.

An MBSFN RS may be transmitted via a subframe allocated for MBSFN transmission. A PRS may be used for location estimation of a UE. A CSI RS is used for channel estimation for a PDSCH of a LTE-A UE.

Generally, an RS is transmitted as a sequence. Any sequence may be used as an RS sequence without particular restrictions. The RS sequence may be a phase shift keying (PSK)-based computer generated sequence. Examples of PSK include binary phase shift keying (BPSK), quadrature phase shift keying (QPSK), or the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, or the like. Alternatively, the RS sequence may be a pseudo-random (PN) sequence. Examples of the PN sequence include an m-sequence, a computer generated sequence, a Gold sequence, a Kasami sequence, or the like. In addition, the RS sequence may be a cyclically shifted sequence.

Hereinafter, event-triggering conditions for measurement reporting are described in detail.

Ten types of event-triggering conditions are defined for measurement reporting (see Table 1), and each event-triggering condition includes an entering condition and a leaving condition. A UE that satisfies an entering condition of an event from a BS may perform measurement reporting to the BS. When the UE performing measurement reporting satisfies a leaving condition of the event, the UE may stop measurement reporting to the BS. Hereinafter, an entering condition and a leaving condition of each event are illustrated.

1. Event A1 (Serving becomes better than threshold)
   (1) Event A1-1 entering condition: $Ms-Hys>Thresh$
   (2) Event A1-2 leaving condition: $Ms+Hys<Thresh$
2. Event A2 (Serving becomes worse than threshold)
   (1) Event A2-1 entering condition: $Ms+Hys<Thresh$
   (2) Event A2-2 leaving condition: $Ms-Hys>Thresh$ A UE triggers an event based on a measurement result Ms of a serving cell. After applying each parameter, event A1 is triggered when the measurement result Ms of the serving cell is better than the threshold of event A1, while event A2 is triggered when the measurement result Ms of the serving cell is worse than the threshold of event A2.

3. Event A3 (Neighbour becomes offset better than PCell/PSCell)
   (1) Event A3-1 entering condition: $Mn+Ofn+Ocn-Hys>Mp+Ofp+Ocp+Off$
   (2) Event A3-2 leaving condition: $Mn+Ofn+Ocn+Hys<Mp+Ofp+Ocp+Off$
4. Event A4 (Neighbour becomes better than threshold)
   (1) Event A4-1 entering condition: $Mn+Ofn+Ocn-Hys>Thresh$
   (2) Event A4-2 leaving condition: $Mn+Ofn+Ocn+Hys<Thresh$ A UE triggers an event based on a measurement result Mp of a serving cell and a measurement result Mn of a neighboring cell. After applying each parameter, event A3 is triggered when the measurement result Mn of the neighboring cell is better than the offset of event A3, while event A4 is triggered when the measurement result Mn of the neighboring cell is better than the threshold of event A4.

5. Event A5 (PCell/PSCell becomes worse than threshold1 and neighbour becomes better than threshold2)
    (1) Event A5-1 entering condition: Mp+Hys<Thresh)
    (2) Event A5-2 entering condition: Mn+Ofn+Ocn−Hys>Thresh2
    (3) Event A5-3 leaving condition: Mp−Hys>Thresh)
    (4) Event A5-4 leaving condition: Mn+Ofn+Ocn+Hys<Thresh2

A UE triggers an event based on a measurement result Mp of a PCell/PSCell and a measurement result Mn of a neighboring cell. After applying each parameter, event A5 is triggered when the measurement result Mp of the PCell/PSCell is worse than threshold 1 of event A5 and the measurement result Mn of the neighboring cell is better than threshold 2 of event A5.

6. Event A6 (Neighbour becomes offset better than SCell)
    (1) Event A6-1 entering condition: Mn+Ocn−Hys>Ms+Ocs+Off
    (2) Event A6-2 leaving condition: Mn+Ocn+Hys<Ms+Ocs+Off A UE triggers an event based on a measurement result Ms of a serving cell and a measurement result Mn of a neighboring cell. After applying each parameter, event A6 is triggered when the measurement result Mn of the neighboring cell is better than the offset of event A6.

7. Event B1 (Inter RAT neighbour becomes better than threshold)
    (1) Event B1-1 entering condition: Mn+Ofn−Hys>Thresh
    (2) Event B1-2 leaving condition: Mn+Ofn+Hys<Thresh A UE triggers an event based on a measurement result Mn of a neighboring cell. After applying each parameter, event B1 is triggered when the measurement result Mn of the neighboring cell is better than the threshold of event B1.

8. Event B2 (PCell becomes worse than threshold) and inter RAT neighbour becomes better than threshold2)
    (1) Event B2-1 entering condition: Mp+Hys<Thresh1
    (2) Event B2-2 entering condition: Mn+Ofn−Hys>Thresh2
    (3) Event B2-3 leaving condition: Mp−Hys>Thresh1
    (4) Event B2-4 leaving condition: Mn+Ofn+Hys<Thresh2

A UE triggers an event based on a measurement result Mp of a PCell/PSCell and a measurement result Mn of a neighboring cell. After applying each parameter, event B2 is triggered when the measurement result Mp of the PCell/PSCell is worse than threshold 1 of event B2 and the measurement result Mn of the neighboring cell is better than threshold 2 of event B2.

9. Event C1 (CSI-RS resource becomes better than threshold)
    (1) Event C1-1 entering condition: Mcr+Ocr−Hys>Thresh
    (2) Event C1-2 leaving condition: Mcr+Ocr+Hys<Thresh A UE triggers an event based on a CSI-RS measurement result Mcr. After applying each parameter, event C1 is triggered when the CSI-RS measurement result Mcr is better than the threshold of event C1.

10. Event C2 (CSI-RS resource becomes offset better than reference CSI-RS resource)
    (1) Event C2-1 entering condition: Mcr+Ocr−Hys>Mref+Oref+Off
    (2) Event C2-2 leaving condition: Mcr+Ocr+Hys<Mref+Oref+Off A UE triggers an event based on a CSI-RS measurement result Mcr and a measurement result Mref of a reference CSI-RS resource. After applying each parameter, event C2 is triggered when the measurement result Mref of the reference CSI-RS resource is better than the offset of event C2.

Parameters defined for each event are as follows.

Ms is a measurement result of a serving cell, which does not consider any offset.

Mp is a measurement result of a PCell/PSCell, which does not consider any offset.

Mn is a measurement result of a neighboring cell, which does not consider any offset.

Mcr is a measurement result of a CSI-RS resource, which does not consider any offset.

Hys is a hysteresis parameter for each event (that is, a hysteresis defined in a reporting configuration EUTRA (reportConfigEUTRA) for each event).

Ofn is a frequency-specific offset for a frequency of a neighboring cell (that is, an offset frequency defined in a measurement object EUTRA (measObjectEUTRA) corresponding to a frequency of a neighboring cell).

Ocs is a cell-specific offset for a serving cell (that is, a cell individual offset (cellIndividualOffset) defined in a measurement object EUTRA corresponding to a frequency of a serving cell). If no Ocs is set for a serving cell, the offset is set to 0.

Ocn is a cell-specific offset for a neighboring cell (that is, a cell individual offset defined in a measurement object EUTRA corresponding to a frequency of a neighboring cell). If no Ocn is set for a neighboring cell, the offset is set to 0.

Ofp is a frequency-specific offset for a frequency of a PCell/PSCell (that is, an offset frequency defined in a measurement object EUTRA corresponding to a frequency of a PCell/PSCell).

Ocp is a cell-specific offset for a PCell/PSCell (that is, a cell individual offset defined in a measurement object EUTRA corresponding to a frequency of a PCell/PSCell). If no Ocp is set for a PCell/PSCell, the offset is set to 0.

Ocr is a CSI-RS-specific offset (that is, a CSI-RS individual offset (csi-RS-IndividualOffset) defined in a measurement object EUTRA corresponding to a frequency of a CSI-RS resource). If no Ocr is set for a CSI-RS resource, the offset is set to 0.

Mref is a measurement result of a reference CSI-RS resource (that is, a measurement result of a reference CSI-RS resource defined in a reporting configuration EUTRA for event C2), which does not consider any offset.

Oref is a CSI-RS-specific offset for a reference CSI-RS resource (that is, a CSI-RS individual offset defined in a measurement object EUTRA corresponding to a frequency of a reference CSI-RS resource). If no Oref is set for a CSI-RS resource, the offset is set to 0.

Thresh is a threshold parameter for each event (that is, a threshold defined in a reporting configuration EUTRA for each event). Different threshold parameters may be used respectively for events A1 to C2.

Off is an offset parameter for each event (that is, an offset defined in a reporting configuration EUTRA for each event). Different offset parameters may be used respectively for events A3, A6, and C2.

A BS may report or may not report a serving-cell quality threshold (s-Measure). When the BS reports the quality threshold of a serving cell, a UE performs the measurement of a neighboring cell and the evaluation of an event (determining whether an event-triggering condition is satisfied, also referred to as the evaluation of reporting criteria) when the quality (RSRP) of the serving cell is lower than the quality threshold of the serving cell. When the BS does not report the quality threshold of the serving cell, the UE performs the measurement of the neighboring cell and the evaluation of an event without depending on the quality (RSRP) of serving cell.

Hereinafter, an LTE service in an unlicensed band is described.

A licensed band guarantees higher reliability and communication quality than those of an unlicensed band as a shared resource, since the exclusive right to use the licensed band is assigned to a single service provider. However, enormous costs are expended in securing a licensed band through spectrum auctions or the like, and securing an additional frequency is absolutely needed in order to deal with the current demand for data. As a solution, an LTE service in an unlicensed band (LTE on unlicensed spectrum (LTE-U)) has been proposed.

Figure 13:
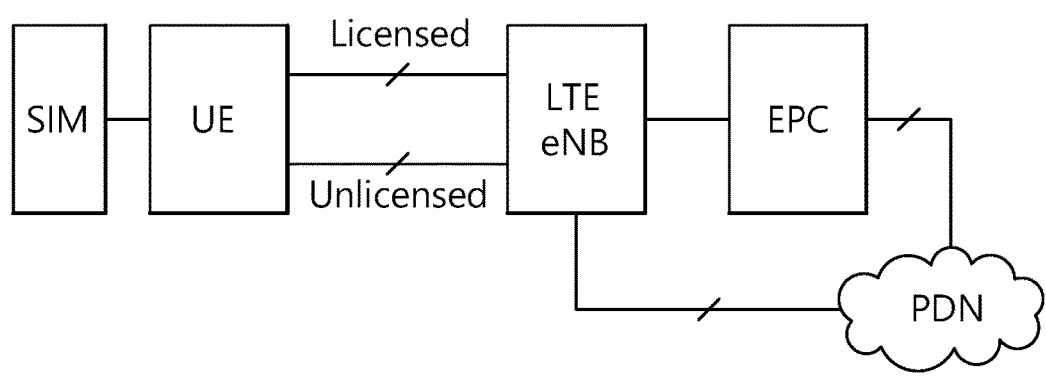
FIG. 13 illustrates a network configuration in which licensed and unlicensed bands are integrated.

LTE-U can provide improved mobility, security, and communication quality by extending advantages of LTE to an unlicensed band and can increase data throughput due to higher frequency efficiency of LTE than that of existing radio access technologies. Further, referring to FIG. 13, which illustrates a network in which licensed and unlicensed bands are integrated, LTE-U is fairly advantageous in terms of investment and management costs in that licensed and unlicensed bands can be managed as a single integrated network without significantly alterations to an existing core network.

However, since transmission output is generally restricted in an unlicensed band, an unlicensed band mostly provides smaller coverage than a licensed band that can be exclusively used, even though the unlicensed band is the same frequency band as the licensed band. Further, to comply with regulations set to minimize interference with other communication modes or communication devices of other service providers also present in the same frequency band, uniform levels of services may not be guaranteed in a certain area. Further, when service coverage is established based on an existing cellular mode using an unlicensed band, reliability in the transmission of an important signal, which needs to be transmitted through a control channel or the like, may not be sufficiently ensured. To avoid these problems and to maximally bring advantages of an unlicensed band, it is proposed to use an unlicensed band for CA in combination with an LTE service in a licensed band or as a supplement downlink (SDL).

Signal transmission, which needs to have guaranteed reliability to provide LTE services, such as network management, radio resource allocation, UE mobility control, and the like, is achieved through LTE in a licensed band serving as a primary component carrier (PCC). However, LTE in an unlicensed band may accommodate both a scenario for supporting both an uplink and a downlink and a scenario for supporting a downlink only, but always serves as a secondary component carrier (SCC) and operates in a manner for improving performance, such as cell capacity and average data rate per user, by supplementing an LTE service on a PCC. In a scenario where an LTE service in an unlicensed band is provided via integration with an LTE service in a licensed band, cross-carrier scheduling technology, security and QoS guaranteeing technology, or the like, which can be achieved in CA between licensed bands, may be applied and the performance of an LTE service in an unlicensed band, which is relatively vulnerable to interference, may be supplemented through inter-cell interference coordination (ICIC).

A key issue of LTE-U services is a fairness problem caused by coexistence with existing radio access technologies in an unlicensed band, especially WLAN technology. Since LTE and WLAN technologies are fundamentally different in PHY/MAC architecture, if these technologies coexist in a single band, a fairness problem may seriously arise in that services are concentrated only in LTE. That is, LTE can share a frequency using an OFDMA scheme, whereas a WLAN employs CSMA/CA and thus cannot share a channel but waits until the channel is idle. Thus, it is highly likely that communication is performed mainly via LTE. To solve this problem, a Listen Before Talk (LBT) mechanism for checking the presence of other communication radio waves that may cause interference in a corresponding band may be applied.

Radio resource management (RRM) measurement based on RSRP/RSRQ in an unlicensed band is useful for the addition, removal and change of an unlicensed SCell. However, even though a wireless channel has very good quality, if there are many competitors (that is, many WLAN APs and STAs), expected throughput is not good. Therefore, it is necessary to consider load on the channel. There are two options to reflect a channel load state in network decisions associated with an unlicensed SCell.

(1) Option 1: A UE measures and reports only radio conditions. A network measures load in an unlicensed band.

(2) Option 2: A UE measures and reports not only load but also radio conditions.

However, network-based load detection may not be sufficient, which will be described in detail with reference to FIG. 14.

Figure 14:
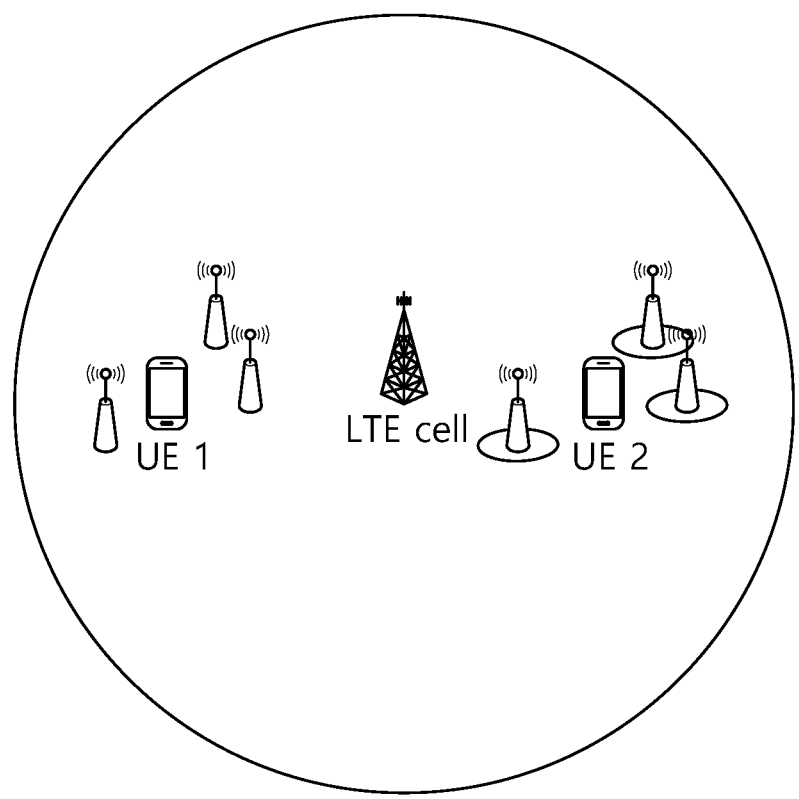
FIGS. 14 and 15 illustrate an environment in which an unlicensed LTE cell and WLAN APs coexist.
Figure 15:
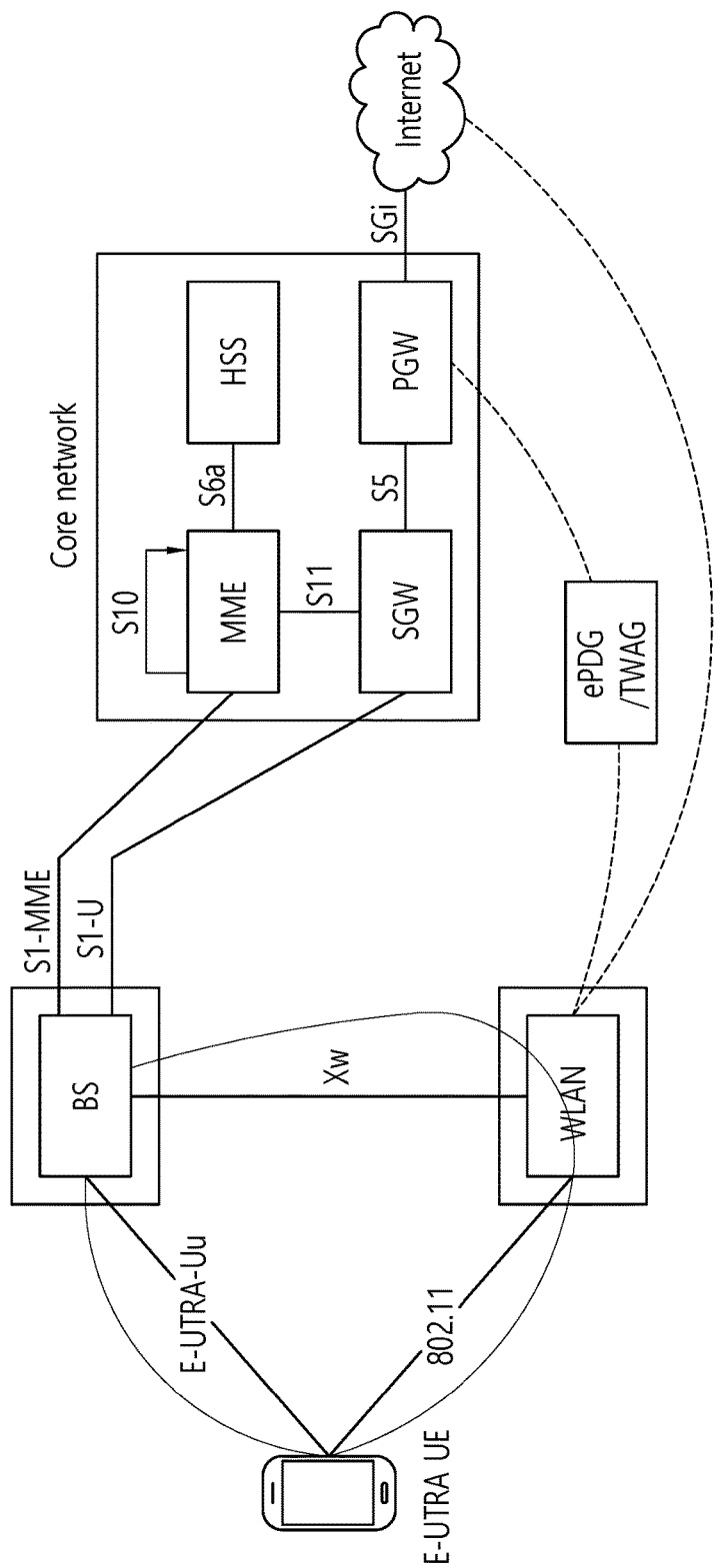

FIGS. 14 and 15 illustrate an environment in which an unlicensed LTE cell and WLAN APs coexist.

Referring to FIG. 14, suppose that there are two UEs in the unlicensed LTE cell and many WLAN APs are disposed around the UEs. Suppose that WLAN APs around UE 1 are not busy while many APs surrounding UE 2 are busy. Since the WLAN APs have small coverage, an LTE network may not detect the APs. Therefore, even though the LTE network performs data transmission after an LBT, UE 2 may not receive data due to interference from the APs. In this case, despite good radio quality, this LTE cell may be unsuitable for UE 2. Likewise, current RSRQ-based RRM measurement may not be sufficient in the unlicensed band. Although the problem of a hidden node cannot be completely solved, it is needed to minimize interference in a UE from the hidden node.

Referring to FIG. 15, when an operator WLAN AP is deployed, an LTE cell can obtain load information through a new interface Xw. However, many non-operator WLAN APs may be deployed in the coverage of an unlicensed LTE cell. A WLAN may report BSS load information via a beacon or probe response, and the load information may include the number of STAs, channel utilization rate, and available channel capacity of a BSS. However, considering the coverage of the WLAN APs, it may be impossible for the LTE cell to receive this load information.

Therefore, in order to solve the above problems, the present invention proposes a method for minimizing interference from a hidden node on an unlicensed frequency. According to an embodiment of the present invention, the method may include: a step in which a UE obtains BSS load information from a WLAN AP around the UE (step 1): a step in which the UE calculates a load-specific offset from the BSS load information based on a load mapping rule (step 2); and a step in which the UE applies the load-specific offset to a measurement report-triggering event (step 3). Hereinafter, each step will be described in detail.

(1) Step 1:

A UE may receive BSS load information from a WLAN AP around the UE. The BSS load information may include at least one of the number of STAs, channel utilization rate, and available channel capacity of the BSS. A WLAN may report the BSS load information through a beacon or a probe response.

(2) Step 2:

The UE may calculate a load-specific offset from the BSS information.

The load-specific offset may have a small value if the channel utilization rate of the BSS is high. High channel utilization rate may mean that a corresponding channel is occupied by a great amount of traffic or a great number of APs or UEs. On the contrary, the load-specific offset may have a large value if the channel utilization rate of the BSS is low.

The load-specific offset may have a large value if the available channel capacity of the BSS is high. On the contrary, the load-specific offset may have a small value if the available channel capacity of the BSS is small.

The load-specific offset may be a negative value, zero or a positive value. The load-specific offset may be calculated in decibels (dB).

A load mapping rule may be used to calculate the load-specific offset. The UE may receive a load mapping table from an LTE cell on a license frequency. The load mapping table may include one or more offset values. The UE may select a load-specific offset corresponding to the channel utilization rate or the available channel capacity from the load mapping table based on information on the channel utilization rate or the available-channel capacity.

Hereinafter, a method in which the UE calculates the load-specific offset on the assumption that the load mapping table includes two offsets (−20 dB and 20 dB) will be described.

The channel utilization rate may be used for calculating the load-specific offset. When the channel utilization rate of the BSS is high (that is, load is large), the UE may select a load-specific offset of −20 dB. When the channel utilization rate of the BSS is low (that is, load is small), the UE may select a load-specific offset of 20 dB. A predefined channel utilization rate threshold may be used to determine whether the channel utilization rate of the BSS is high or low.

The available channel capacity may be used for calculating the load-specific offset. When the available channel capacity of the BSS is small (that is, load is large), the UE may select a load-specific offset of −20 dB. When the available channel capacity of the BSS is high (that is, load is small), the UE may select a load-specific offset of 20 dB. A predefined available channel capacity threshold may be used to determine whether the available channel capacity of the BSS is high or low.

The load-specific offsets of −20 dB and 20 dB are merely examples, and the load-specific offset is not limited to these values.

The UE may obtain the BSS load information from a plurality of WLAN APs. That is, a plurality of pieces of BSS load information may be received. In this case, the UE may calculate a load-specific offset based on the average value of the obtained pieces of BSS load information. Alternatively, the UE may calculate a load-specific offset based on BSS load information obtained from the strongest AP (that is, an AP providing a strong signal).

(3) Step 3:

The UE may apply the load-specific offset to a measurement report-triggering event. The measurement report-triggering event is the same concept as an event-triggering condition for measurement reporting, and the event-triggering conditions for measurement reporting have already been described.

Oln may be a load-specific offset for a frequency of a neighboring cell on an unlicensed frequency. As load on the frequency of the neighboring cell on the unlicensed frequency is higher (for example, as the channel utilization rate of a BSS in the neighboring cell is higher or the available channel capacity of the BSS in the neighboring cell is smaller), Oln has a smaller value.

Ols may be a load-specific offset for a frequency of a serving cell on an unlicensed frequency. As load on the frequency of the serving cell on the unlicensed frequency is higher (for example, as the channel utilization rate of a BSS in the serving cell is higher or the available channel capacity of the BSS in the serving cell is smaller), Ols has a smaller value.

The load-specific offset may be a negative value, zero or a positive value. The load-specific offset may be applied only in an unlicensed frequency. When the serving cell operates on a licensed frequency, Ols may not be used. Likewise, when the neighbor cell operates on a licensed frequency, Oln may not be used.

In high load, the entering conditions may be more likely to be satisfied by applying the load-specific offset to the event-triggering conditions. Therefore, the UE may more easily transmit a measurement report. On the contrary, the leaving conditions may be less likely to be satisfied by applying the load-specific offset to the event-triggering conditions.

Hereinafter, various examples in which the load-specific offset Oln or Ols is applied to the event-triggering conditions will be described.

1. Application of Ols to Event A1

(1) Event A1-1 entering condition: Ms−Hys−Ols>Thresh (2) Event A1-2 leaving condition: Ms+Hys−Ols<Thresh As the load on the frequency of the serving cell is higher (for example, as the channel utilization rate of a BSS in the serving cell is higher or the available channel capacity of the BSS in the serving cell is smaller), Ols is smaller. Thus, Ms−Hys−Ols may be more likely to be greater than a threshold. That is, as the load on the frequency of the serving cell is higher, the event A1-1 entering condition may be more likely to be satisfied, while the event A1-2 leaving condition may be less likely to be satisfied.

2. Application of Ols to Event A2

(1) Event A2-1 entering condition: Ms+Hys+Ols<Thresh (2) Event A2-2 leaving condition: Ms−Hys+Ols>Thresh As the load on the frequency of the serving cell is higher (for example, as the channel utilization rate of a BSS in the serving cell is higher or the available channel capacity of the BSS in the serving cell is smaller), Ols is smaller. Thus, Ms+Hys+Ols may be more likely to be smaller than a threshold. That is, as the load on the frequency of the serving cell is higher, the event A2-1 entering condition may be more likely to be satisfied, while the event A2-2 leaving condition may be less likely to be satisfied.

3. Application of Ols and Oln to Event A3

(1) Event A3-1 entering condition: Mn+Ofn+Ocn−Hys+Oln>Mp+Ofp+Ocp+Off+Ols (2) Event A3-2 leaving condition: Mn+Ofn+Ocn+Hys+Oln<Mp+Ofp+Ocp+Off+Ols When Oln<Ols (that is, when the load on the neighboring cell is greater than the load on the serving cell), it is preferable that the UE stays in the serving cell. Thus, the event A3-1 entering condition may be less likely to be satisfied, while A3-2 leaving condition may be more likely to be satisfied.

When Oln>Ols (that is, when the load on the serving cell is greater than the load on the neighboring cell), it is not preferable that the UE stays in the serving cell. Thus, the event A3-1 entering condition may be more likely to be satisfied, while A3-2 leaving condition may be less likely to be satisfied.

4. Application of Oln to Event A4

(1) Event A4-1 entering condition: Mn+Ofn+Ocn−Hys+Oln>Thresh (2) Event A4-2 leaving condition: Mn+Ofn+Ocn+Hys+Oln<Thresh When the load on the frequency of the neighboring cell is high (for example, when the channel utilization rate of a BSS in the neighboring cell is high or the available channel capacity of the BSS in the neighboring cell is small), it is preferable that the UE stays in the serving cell. As the load on the frequency of the neighboring cell is higher, Oln is smaller. Thus, Mn+Ofn+Ocn−Hys+Oln may be less likely to be greater than a threshold. That is, as the load on the frequency of the neighboring cell is higher, the event A4-1 entering condition may be less likely to be satisfied, while the event A4-2 leaving condition may be more likely to be satisfied.

5. Application of Ols and Oln to Event A5

(1) Event A5-1 entering condition: Mp+Hys+Ols<Thresh1

(2) Event A5-2 entering condition: Mn+Ofn+Ocn−Hys+Oln>Thresh2

(3) Event A5-3 leaving condition: Mp−Hys+Ols>Thresh1

(4) Event A5-4 leaving condition: Mn+Ofn+Ocn+Hys+Oln<Thresh2

As the load on the frequency of the serving cell is higher (for example, as the channel utilization rate of a BSS in the serving cell is higher or the available channel capacity of the BSS in the serving cell is smaller), Ols is smaller. Thus, Mp+Hys+Ols may be more likely to be smaller than threshold 1. That is, as the load on the frequency of the serving cell is higher, the event A5-1 entering condition may be more likely to be satisfied, while the event A5-3 leaving condition may be less likely to be satisfied.

When the load on the frequency of the neighboring cell is high (for example, when the channel utilization rate of a BSS in the neighboring cell is high or the available channel capacity of the BSS in the neighboring cell is small), it is preferable that the UE stays in the serving cell. As the load on the frequency of the neighboring cell is higher, Oln is smaller. Thus, Mn+Ofn+Ocn−Hys+Oln may be less likely to be greater than threshold 2. That is, as the load on the frequency of the neighboring cell is higher, the event A5-2 entering condition may be less likely to be satisfied, while the event A5-4 leaving condition may be more likely to be satisfied.

6. Application of Ols and Oln to Event A6

(1) Event A6-1 entering condition: Mn+Ocn−Hys+Oln>Ms+Ocs+Off+Ols (2) Event A6-2 leaving condition: Mn+Ocn+Hys+Oln<Ms+Ocs+Off+Ols When Oln<Ols (that is, when the load on the neighboring cell is greater than the load on the serving cell), it is preferable that the UE stays in the serving cell. Thus, the event A6-1 entering condition may be less likely to be satisfied, while A6-2 leaving condition may be more likely to be satisfied.

When Oln>Ols (that is, when the load on the serving cell is greater than the load on the neighboring cell), it is not preferable that the UE stays in the serving cell. Thus, the event A6-1 entering condition may be more likely to be satisfied, while A6-2 leaving condition may be less likely to be satisfied.

7. Application of Oln to Event B1

(1) Event B1-1 entering condition: Mn+Ofn−Hys+Oln>Thresh (2) Event B1-2 leaving condition: Mn+Ofn+Hys+Oln<Thresh When the load on the frequency of the neighboring cell is high (for example, when the channel utilization rate of a BSS in the neighboring cell is high or the available channel capacity of the BSS in the neighboring cell is small), it is preferable that the UE stays in the serving cell. As the load on the frequency of the neighboring cell is higher, Oln is smaller. Thus, Mn+Ofn−Hys+Oln may be less likely to be greater than a threshold. That is, as the load on the frequency of the neighboring cell is higher, the event B1-1 entering condition may be less likely to be satisfied, while the event B1-2 leaving condition may be more likely to be satisfied.

8. Application of Ols and Oln to Event B2

(1) Event B2-1 entering condition: Mp+Hys+Ols<Thresh1

(2) Event B2-2 entering condition: Mn+Ofn−Hys+Oln>Thresh2

(3) Event B2-3 leaving condition: Mp−Hys+Ols>Thresh1

(4) Event B2-4 leaving condition: Mn+Ofn+Hys+Oln<Thresh2

As the load on the frequency of the serving cell is higher (for example, as the channel utilization rate of a BSS in the serving cell is higher or the available channel capacity of the BSS in the serving cell is smaller), Ols is smaller. Thus, Mp+Hys+Ols may be more likely to be smaller than threshold 1. That is, as the load on the frequency of the serving cell is higher, the event B2-1 entering condition may be more likely to be satisfied, while the event B2-3 leaving condition may be less likely to be satisfied.

When the load on the frequency of the neighboring cell is high (for example, when the channel utilization rate of a BSS in the neighboring cell is high or the available channel capacity of the BSS in the neighboring cell is small), it is preferable that the UE stays in the serving cell. As the load on the frequency of the neighboring cell is higher, Oln is smaller. Thus, Mn+Ofn−Hys+Oln may be less likely to be greater than threshold 2. That is, as the load on the frequency of the neighboring cell is higher, the event B2-2 entering condition may be less likely to be satisfied, while the event B2-4 leaving condition may be more likely to be satisfied.

Figure 16:
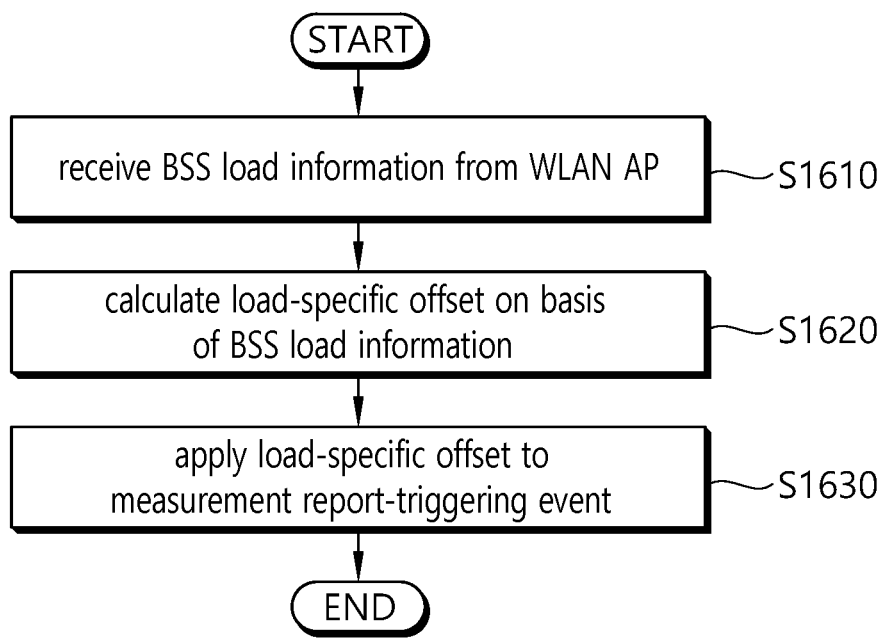
FIG. 16 is a block diagram illustrating a method in which a UE applies a load-specific offset according to an embodiment of the present invention.

FIG. 16 is a block diagram illustrating a method in which a UE applies a load-specific offset according to an embodiment of the present invention.

The UE may receive BSS load information from a WLAN AP (S1610).

The BSS load information may include at least one of the number of STAs, channel utilization rate, and available channel capacity of a BSS. The BSS load information may be received from a plurality of WLAN APs.

The UE may calculate a load-specific offset based on the BSS load information (S1620).

As the channel utilization rate is higher, the load-specific offset may be smaller. As the available channel capacity is higher, the load-specific offset may be larger. When the channel utilization rate is higher than a predefined channel utilization rate threshold, the load-specific offset may have a negative value. When the channel utilization rate is lower than the predefined channel utilization rate threshold, the load-specific offset may have a positive value. When the available channel capacity is higher than a predefined available channel capacity threshold, the load-specific offset may have a positive value. When the available channel capacity is lower than the predefined available channel capacity threshold, the load-specific offset may have a negative value.

The UE may receive a load mapping table including one or more offsets. The load-specific offset may be an offset corresponding to the BSS load information among the one or more offsets. As the channel utilization rate is higher, the offset corresponding to the BSS load information may be smaller. As the available channel capacity is higher, the offset corresponding to the BSS load information may be larger.

A plurality of pieces of BSS load information may be received. In this case, the load-specific offset may be calculated based on BSS load information received from a WLAN AP providing the strongest signal. Alternatively, the load-specific offset may be calculated based on the average value of the plurality of pieces of BSS load information.

The load-specific offset may be applied to a measurement report-triggering event in an unlicensed frequency. The load-specific offset may not be applied to a measurement report-triggering event in a licensed frequency.

The UE may apply the load-specific offset to a measurement report-triggering event (S1630).

Measurement report-triggering event A1 to which the load-specific offset is applied may be defined as below.
Event A1-1 entering condition: Ms−Hys−Ols>Thresh
Event A1-2 leaving condition: Ms+Hys−Ols<Thresh
Measurement report-triggering event A2 to which the load-specific offset is applied may be defined as below.
Event A2-1 entering condition: Ms+Hys+Ols<Thresh
Event A2-2 leaving condition: Ms−Hys+Ols>Thresh
Measurement report-triggering event A6 to which the load-specific offset is applied may be defined as below.
Event A6-1 entering condition: Mn+Ocn−Hys+Oln>Ms+Ocs+Off+Ols
Event A6-2 leaving condition: Mn+Ocn+Hys+Oln<Ms+Ocs+Off+Ols In the above event entering conditions or the above event leaving conditions, Ms may be a measurement result with respect to a serving cell, Mn may be a measurement result with respect to a neighboring cell, Ocs may be a cell-specific offset for the serving cell, Ocn may be a cell-specific offset for the neighboring cell, Hys may be a hysteresis parameter for each event, Off may be an offset parameter for each event, Ols may be a load-specific offset calculated for the serving cell among the load-specific offsets, and Oln may be a load-specific offset calculated for the neighboring cell among the load-specific offsets.

Figure 17:
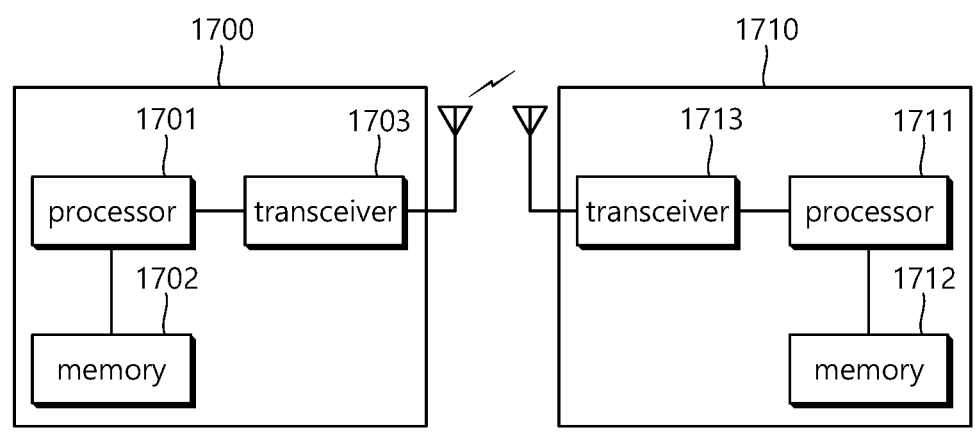
FIG. 17 is a block diagram illustrating a wireless communication system according to the embodiment of the present invention.

FIG. 17 is a block diagram illustrating a wireless communication system according to the embodiment of the present invention.

A BS 1700 includes a processor 1701, a memory 1702 and a transceiver 1703. The memory 1702 is connected to the processor 1701, and stores various information for driving the processor 1701. The transceiver 1703 is connected to the processor 1701, and transmits and/or receives radio signals. The processor 1701 implements proposed functions, processes and/or methods. In the above embodiment, an operation of the base station may be implemented by the processor 1701.

A UE 1710 includes a processor 1711, a memory 1712 and a transceiver 1713. The memory 1712 is connected to the processor 1711, and stores various information for driving the processor 1711. The transceiver 1713 is connected to the processor 1711, and transmits and/or receives radio signals. The processor 1711 implements proposed functions, processes and/or methods. In the above embodiment, an operation of the UE may be implemented by the processor 1711.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for applying, by a user equipment (UE), a load-specific offset in a wireless communication system, the method comprising:
receiving basic service set (BSS) load information including a channel utilization rate of a BSS, from a wireless local area network (WLAN) access point (AP);
calculating a load-specific offset, based on the BSS load information; and
applying the load-specific offset to a measurement report-triggering event,
wherein the load-specific offset has a negative value when the channel utilization rate is higher than a predefined channel utilization rate threshold, and wherein the load-specific offset has a positive value when the channel utilization rate is lower than the predefined channel utilization rate threshold.

2. The method of claim 1, wherein the BSS load information further includes a number of stations (STAs) of the BSS.

3. The method of claim 1, further comprising receiving, by the UE, a load mapping table including one or more offsets,
wherein the load-specific offset is an offset related to the BSS load information among the one or more offsets.

4. The method of claim 3, wherein as the channel utilization rate is higher, the offset related to the BSS load information is smaller.

5. The method of claim 4, wherein measurement report-triggering event A1 to which the load-specific offset is applied is defined as below:
Entering condition: Ms−Hys−Ols>Thresh; and
Leaving condition: Ms+Hys−Ols<Thresh,
where Ms is a measurement result for a serving cell, Hys is a hysteresis parameter for event A1, Ols is the load-specific offset, and Thresh is a threshold parameter for event A1.

6. The method of claim 1, wherein measurement report-triggering event A2 to which the load-specific offset is applied is defined as below:
Entering condition: Ms+Hys+Ols<Thresh; and
Leaving condition: Ms−Hys+Ols>Thresh,
where Ms is a measurement result for a serving cell, Hys is a hysteresis parameter for event A2, Ols is the load-specific offset, and Thresh is a threshold parameter for event A2.

7. The method of claim 1, wherein a plurality of the BSS load information is received.

8. The method of claim 7, wherein the load-specific offset is calculated based on BSS load information received from a WLAN AP providing a strongest signal.

9. The method of claim 7, wherein the load-specific offset is calculated based on an average value of the plurality of the of BSS load information.

10. The method of claim 7, wherein the load-specific offset is applied to the measurement report-triggering event in an unlicensed frequency.

11. A user equipment (UE) for applying a load-specific offset in a wireless communication system, the UE comprising:
a memory;
a transceiver; and
a processor to connect the memory and the transceiver, wherein the processor is configured to:
control the transceiver to receive basic service set (BSS) load information including a channel utilization rate of a BSS, from a wireless local area network (WLAN) access point (AP);
calculate a load-specific offset, based on the BSS load information; and
apply the load-specific offset to a measurement report-triggering event,
wherein the load-specific offset has a negative value when the channel utilization rate is higher than a predefined channel utilization rate threshold, and
wherein the load-specific offset has a positive value when the channel utilization rate is lower than the predefined channel utilization rate threshold.

12. A method for applying, by a user equipment (UE), a load-specific offset in a wireless communication system, the method comprising:
receiving basic service set (BSS) load information including an available channel capacity of a BSS, from a wireless local area network (WLAN) access point (AP);
calculating a load-specific offset, based on the BSS load information; and
applying the load-specific offset to a measurement report-triggering event,
wherein the load-specific offset has a positive value when the available channel capacity is higher than a predefined available channel capacity threshold, and
wherein the load-specific offset has a negative value when the available channel capacity is lower than the predefined available channel capacity threshold.

13. The method of claim 12, wherein measurement report-triggering event A6 to which the load-specific offset is applied is defined as below:
Entering condition: Mn+Ocn−Hys+Oln>Ms+Ocs+Off+Ols; and
Leaving condition: Mn+Ocn+Hys+Oln<Ms+Ocs+Off+Ols,
where Ms is a measurement result for a serving cell, Mn is a measurement result for a neighboring cell, Ocs is a cell-specific offset of the serving cell, Ocn is a cell-specific offset of the neighboring cell, Hys is a hysteresis parameter for event A6, Off is an offset parameter for event A6, Ols is a load-specific offset calculated for the serving cell among the load-specific offset, and Oln is a load-specific offset calculated for the neighboring cell among the load-specific offset.

14. The method of claim 12, wherein the load-specific offset is an offset related to the BSS load information, and as the available channel capacity is higher, the offset related to the BSS load information is larger.

* * * * *